Patented Dec. 2, 1924.

1,518,083

UNITED STATES PATENT OFFICE.

HUGO LOHMANN, OF BERLIN-JOHANNISTHAL, GERMANY.

PROCESS OF ELIMINATING CARBON FROM CARBON-CONTAINING METALS.

No Drawing. Application filed August 26, 1921. Serial No. 495,733.

*To all whom it may concern:*

Be it known that I, HUGO LOHMANN, a citizen of Germany, residing at 4a Sternplatz, Berlin-Johannisthal, Germany, have invented certain new and useful Improvements in Processes of Eliminating Carbon from Carbon-Containing Metals (for which I filed application in Germany, January 13, 1919), of which the following is a specification.

This invention relates to a process for the removal of the carbon from metals of a high melting temperature, such as tungsten, uranium, and the like, which have taken up carbon through a smelting process in carbon crucibles.

The removal of carbon can only be effected according to the present state of the art by the so called tempering which, however, fails in the case of metals of a high melting temperature, because the necessary coverings for tempering, which contain oxygen, will only withstand low temperatures, and, at high temperatures, sinter together to a great degree and then do not remove the carbon in the manner characteristic of the tempering of iron, but bring about a new oxidation of the work material.

The present process is based upon the knowledge that where metals of a high melting point, such as tungsten, uranium and the like, contain carbon either in combination therewith in the form of a metallic carbide or in a free state, the carbon may be liberated when the metal is heated to a temperature near its melting point.

Metallic tungsten, for example, melts at 2900° C., and where carbon is present therewith an appreciable liberation of carbon can be observed, even when the material is heated to from 2300° to 2400° C. in the absence of any oxidizing agents such as oxides, oxygen and the like.

The present process is carried out by heating the articles to be treated in a furnace of any desired construction up to nearly the melting point either in a vacuum or by passing a current of gas through the heating chamber and removing the carbon which escapes from the articles in the melting chamber.

Processes are known, according to which such metals of high melting point as tungsten, uranium and the like were subjected to heating in a vacuum. These known processes were, however, employed for the purpose of producing a metallic regulus from oxides or sulphides, whereas, on the other hand, the present process brings about the splitting off of carbon which is already present in an already melted state or state of regulus.

On the other hand, my new process is based upon the fact that, since carbon vaporizes at a temperature lower than the melting or fusing point of metals having a high fusing point, and with which carbon may be combined or with which carbon may be present in a free state, the carbon may be liberated from such metals by merely heating the material to near the melting point of the metal without the use of oxidizing agents.

In view of the lower temperature at which the carbon which is present with the metal, either in a combined or a free state, may be liberated, carbon may be carried off and removed by exposing the metal in a highly heated condition to draft action, either by reducing the pressure in the container in which the process is carried on, or by exposing the heated metal to a current of a gas, such as hydrogen, which will not chemically act upon the metal during such operation. The current of hydrogen, in passing over the heated metal, will partly mechanically, and perhaps to some extent chemically, absorb, envelop and become imbued and partly combined with the molecules of the eliminated carbon, so that the carbon may be easily carried off with the gas current.

I claim:—

1. Process for the withdrawal of carbon from carbon-containing metals of a high melting temperature, consisting in heating metal in an airtight chamber to a temperature below the melting point of the metal and at which it gives off carbon, and in removing the liberated carbon from the metal.

2. Process for the withdrawal of carbon from carbon-containing metals of a high melting temperature, consisting in heating metal in an airtight chamber to a temperature near but below the melting point, thereby liberating the carbon, and in removing the liberated carbon from the metal by exhausting the said chamber.

3. Process for the withdrawal of carbon from carbon-containing metals of a high melting temperature, consisting in heating the metal to a temperature at which it gives off carbon, and absorbing the liberated carbon by a carbon-absorbing agent.

4. Process for the withdrawal of carbon from carbon-containing metals of a high melting temperature, consisting in heating the metal to a temperature at which it gives off carbon, and absorbing and carrying off the liberated carbon by a carbon-absorbing gas.

5. Process for the withdrawal of carbon from carbon-containing metals of a high melting temperature, consisting in heating the metal to a temperature at which is gives off carbon, and absorbing and carrying off the liberated carbon by hydrogen.

6. Process for the withdrawal of carbon from carbon-containing metals of a high melting temperature, consisting in heating the metal, such as tungsten, uranium or the like, in an airtight chamber to a temperature at which it gives off carbon, and in removing the liberated carbon from the metal by exhausting the said chamber.

7. Process for the withdrawal of carbon from carbon-containing metals of a high melting temperature, consisting in heating the metal to a temperature at which it gives off carbon, and absorbing the liberated carbon by a carbon-absorbing agent prior to the melting of the said metal.

8. The process of removing carbon from carbon-containing metals which have a high melting point, which consists in heating said metal to a temperature near to but below the melting point to cause it to part with its carbon, and removing the liberated carbon.

9. The process of removing carbon from carbon-containing metals having a high melting point, which consists in heating said metal to a temperature near to and below the melting point to cause the liberation of the carbon, and exposing the heated metal to draft action.

10. The process of eliminating carbon from carbon-containing metals having a high melting point, which consists in heating said metal to a temperature near to but below its melting point, and exposing said heated metal to a current of gas which does not chemically affect the metal and which is adapted to absorb the eliminated carbon, and carrying off said gas current.

In testimony whereof I have signed this specification in the presence of two witnesses.

HUGO LOHMANN.

Witnesses:
GUSTAV HÜBNER,
GOTTLIEB TURICH.